US008422084B2

(12) United States Patent
Nakaya et al.

(10) Patent No.: US 8,422,084 B2
(45) Date of Patent: Apr. 16, 2013

(54) IMAGE PROCESSING APPARATUS, IMAGE READING APPARATUS, IMAGE FORMING APPARATUS WITH UNITS TO CALCULATE SPECTRAL REFLECTANCE AND RELATING COEFFICIENT AND METHODS THEREFOR

(75) Inventors: Fumio Nakaya, Kanagawa (JP); Hirokazu Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1253 days.

(21) Appl. No.: 11/806,958

(22) Filed: Jun. 5, 2007

(65) Prior Publication Data
US 2008/0151325 A1 Jun. 26, 2008

(30) Foreign Application Priority Data
Dec. 22, 2006 (JP) ................................. 2006-345648

(51) Int. Cl.
*H04N 1/387* (2006.01)
*H04N 1/60* (2006.01)

(52) U.S. Cl.
USPC .............................. 358/474; 358/1.9; 348/370

(58) Field of Classification Search .................... None
See application file for complete search history.

(56) References Cited

U.S. PATENT DOCUMENTS

| | | | | |
|---|---|---|---|---|
| 4,870,506 A | * | 9/1989 | Nakauchi | 358/296 |
| 5,249,200 A | * | 9/1993 | Chen et al. | 375/285 |
| 5,771,311 A | * | 6/1998 | Arai | 382/162 |
| 5,864,834 A | * | 1/1999 | Arai | 706/16 |
| 6,571,118 B1 | * | 5/2003 | Utzinger et al. | 600/476 |
| 6,654,150 B1 | * | 11/2003 | Rozzi | 358/520 |
| 6,856,354 B1 | * | 2/2005 | Ohsawa | 348/370 |
| 2001/0019433 A1 | * | 9/2001 | Matsushiro et al. | 358/518 |
| 2001/0021271 A1 | * | 9/2001 | Ishibashi | 382/232 |
| 2004/0090640 A1 | * | 5/2004 | Nino et al. | 358/1.9 |
| 2007/0242293 A1 | * | 10/2007 | Owens | 358/1.9 |
| 2008/0128593 A1 | * | 6/2008 | Nakaya et al. | 250/214 AG |
| 2008/0137110 A1 | * | 6/2008 | Mestha et al. | 358/1.9 |

FOREIGN PATENT DOCUMENTS

| | | |
|---|---|---|
| JP | 61-84150 | 4/1986 |
| JP | 5-110767 | 4/1993 |

OTHER PUBLICATIONS

Healey et al, Linear models for spectral reflectance functions over the mid-wave and long-wave infrared, Optical Society of America, vol. 15, No. 8, Aug. 1998, pp. 2220-2226.*

* cited by examiner

*Primary Examiner* — Vincent Rudolph
(74) *Attorney, Agent, or Firm* — Sughrue Mion, PLLC

(57) ABSTRACT

There is provided an image processing apparatus includes a spectral reflectance calculation unit that calculates spectral reflectances respectively in plural wavelength ranges, based on intensity of reflected light from an object to be imaged and irradiation intensity of light that the object to be imaged is irradiated with; a determination unit that obtains derivatives of a function represented on the basis of the spectral reflectances calculated by the spectral reflectance calculation unit, and determines a number of eigenvectors, depending on whether the derivatives are positive or negative; a coefficient calculation unit that calculates coefficients where the spectral reflectances are expressed by linear combination of the number of eigenvectors and the coefficients respectively related to the eigenvectors, the number of eigenvectors being determined by the determination unit; and an output unit that outputs the coefficients calculated by the coefficient calculation unit.

9 Claims, 6 Drawing Sheets

IMAGE PROCESSING APPARATUS, IMAGE READING APPARATUS, IMAGE FORMING APPARATUS WITH UNITS TO CALCULATE SPECTRAL REFLECTANCE AND RELATING COEFFICIENT AND METHODS THEREFOR

This application is based on and claims priority under 35 USC 119 from Japanese Patent Application No. 2006-345648 filed Dec. 22, 2006.

BACKGROUND

1. Technical Field

The present invention relates to a technique for optically reading an object to be imaged.

2. Related Art

During scanning of an object to be imaged by an image forming device such as a color copier or the like having a scanner, reflection light from an original document is detected first within three wavelength ranges of red, green, and blue by a light receiving element such as a line sensor. Further, through predetermined image processing of obtaining a spectral reflectance for each wavelength range or so, multi-value image data consisting of four colors of yellow, magenta, cyan, and black is generated. As the number of wavelength ranges detectable by the light receiving element increases, the number of colors expressed by combinations of spectral reflectances for the respective wavelength ranges increases. Accordingly, images can be formed with colors reproduced with higher fidelity. In this respect, there has been a demand for a technique for reading an object to be imaged within as many wavelength ranges as possible, i.e., a technique for reading as many colors as possible from an object to be imaged.

SUMMARY

According to one aspect of the invention, an image processing apparatus includes: a spectral reflectance calculation unit that calculates spectral reflectances respectively in plural wavelength ranges, based on intensity of reflected light from an object to be imaged and based on irradiation intensity of light that the object to be imaged is irradiated with; a determination unit that obtains derivatives of a function represented on the basis of the spectral reflectances calculated by the spectral reflectance calculation unit, and determines a number of eigenvectors, depending on whether the derivatives are positive or negative; a coefficient calculation unit that calculates coefficients where the spectral reflectances are expressed by linear combination of the number of eigenvectors and the coefficients respectively related to the eigenvectors, the number of eigenvectors being determined by the determination unit; and an output unit that outputs the coefficients calculated by the coefficient calculation unit.

BRIEF DESCRIPTION OF THE DRAWINGS

An exemplary embodiment of the present invention will be described in detail based on the figures, wherein.

DETAILED DESCRIPTION

An exemplary embodiment of the invention will now be described. A term "object O to be imaged" in the following description is not limited only to a sheet-like object as of an OHP sheet or the like, but can have any type of shape. Another term, "visible light range", noted below is supposed to be a range of approximately 400 to 700 nm.

The exemplary embodiment of the invention will be described first.

Figure 1:
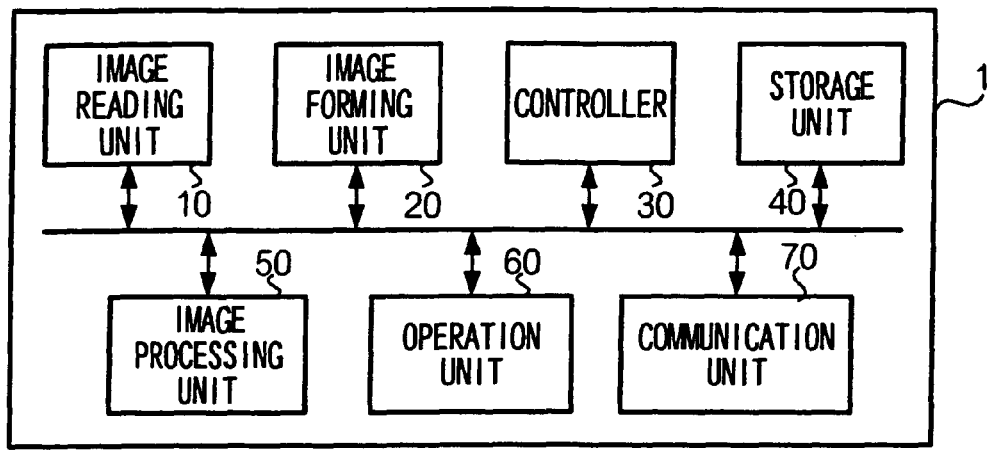
FIG. 1 is a block diagram showing a hardware structure of an image forming device according to the exemplary embodiment of the invention.

FIG. 1 is a block diagram showing a functional structure of an image forming device 1 according to the exemplary embodiment. The image forming device 1 has: an image reading unit 10 which reads an image from a printed material or the like; an image forming unit 20 which forms an image on a recording sheet (medium) based on image data; a controller 30 including a CPU (Central Processing Unit), RAM (Random Access Memory), ROM (Read Only Memory), and the like; a storage unit 40 such as a HD (Hard Disk) which stores data and programs describing operational procedures executed by the controller 30; an image processing unit 50 which performs image processing on image data; a manipulation unit 60 as a user interface such as a touch panel which a user operates to input information; and a communication unit 70 as an interface used for communication via a network. More specifically, the image processing unit 50 includes plural image processing circuits such as ASICs (Application Specific Integrated Circuits) and an LSI (Large Scale Integration), and an image memory which temporarily stores image data. The image processing circuits respectively execute a variety of image processing.

Figure 2:
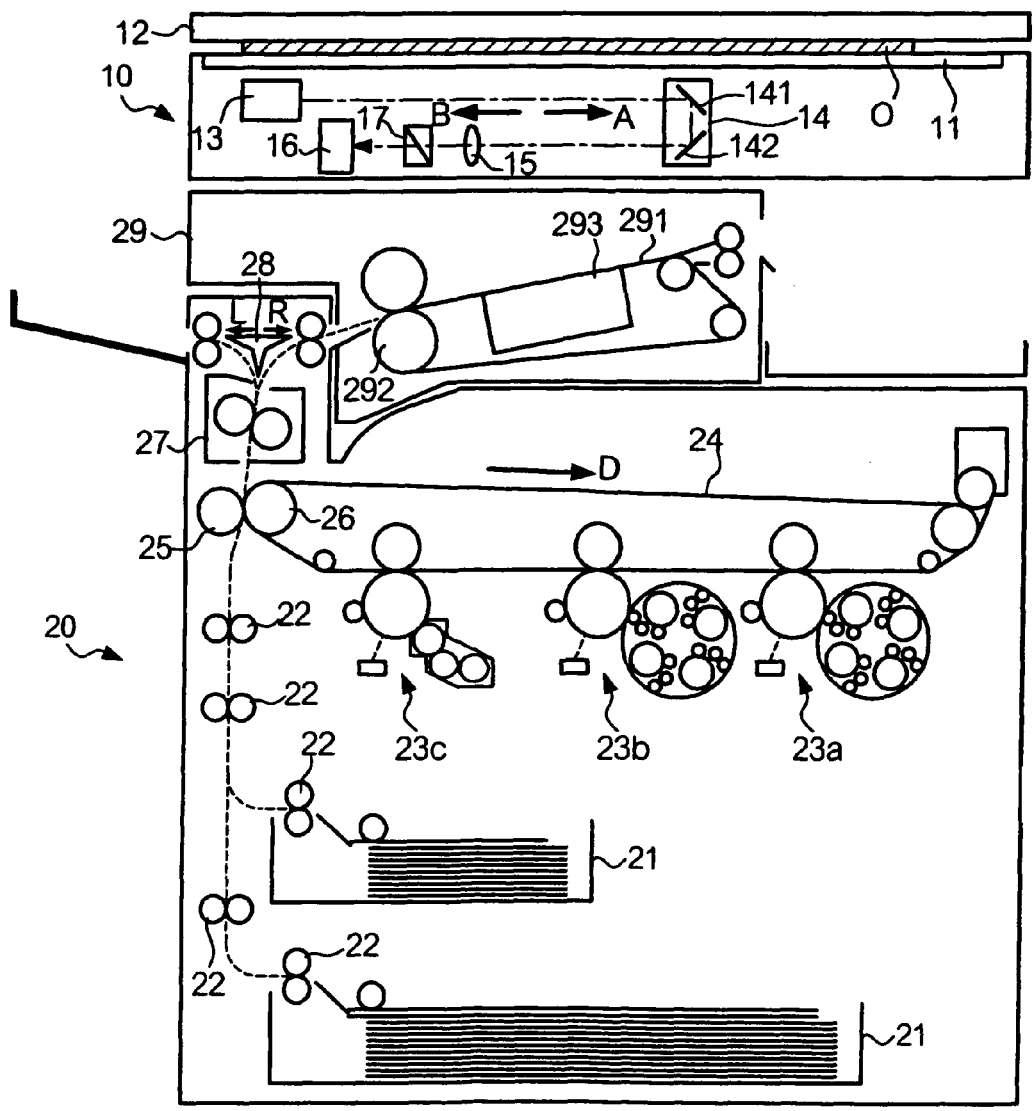
FIG. 2 depicts a device structure of the image forming device according to the exemplary embodiment.

Next, FIG. 2 shows a device structure of the image reading unit 10.

The image reading unit 10 has a function of a so-called image scanner. The image forming unit 20 has a function of a so-called printer. The image reading unit 10 includes a platen glass 11, platen cover 12, full-rate carriage 13, half-rate carriage 14, imaging lens 15, and line sensor 16.

The platen glass 11 is a glass plate on which an object O to be imaged is placed. The platen glass 11 is located so that surfaces are positioned horizontally. On a surface of the platen glass 11, a reflex inhibition layer made of a multi-layered dielectric film or the like is formed to reduce reflection on the surface of the platen glass 11. The reflex inhibition layer is provided so that a reflected light component from the surface of the object O to be imaged, which should primarily be read, may not be read synthesized with an unnecessary reflection light component from the surface of the platen glass 11. Aiming for separation between the reflection light components from the object O and from the surface of the platen glass 11, a predetermined clearance can be maintained, for example by providing a spacer, between the surface of the object O to be imaged and the surface of the platen glass 11, to separate the surfaces apart from each other.

The platen cover 12 is provided so as to cover the platen glass 11. External light is shielded by the platen cover 12 to facilitate reading of the object O placed on the platen glass 11. The full-rate carriage 13 has a light source and a mirror. The light source irradiates standard light $D_{65}$.

Figure 3:
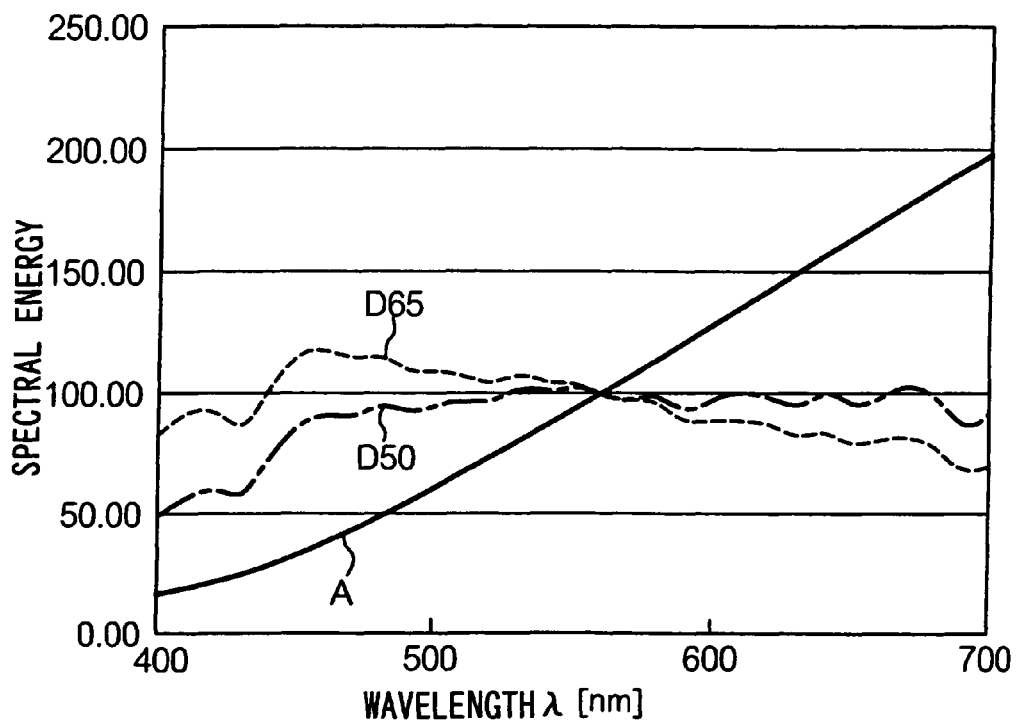
FIG. 3 shows spectral energy distributions of various light sources.

FIG. 3 shows spectral energy distributions of various light sources.

The light $D_{65}$ approximates to a condition of a light source having a color temperature of 6,500K (Kelvin) according to JIS standards and is similar to artificial daylight or natural light avoiding direct sunlight. As shown in the figure, the spectral energy distribution of the light $D_{65}$ is approximately uniform throughout a range of about 400 to 700 nm. Therefore, the light $D_{65}$ is known as light commonly used for color evaluation. In the present exemplary embodiment, a xenon lamp is used as a light source approximate to the light $D_{65}$. The light source irradiates the object O to be imaged at a predetermined incident angle (e.g., 45°) with a predetermined intensity. The mirror forms a light path (denoted by a one-dot-chain line in the figure) along which light once reflected from the object O is further reflected and guided to the half-rate carriage 14. The full-rate carriage 13 moves in a direction of arrow A or B shown in FIG. 2 and scans the whole surface of the object O to be imaged, irradiating the object.

The half-rate carriage 14 has mirrors 141 and 142 and forms a light path to guide light from the full-rate carriage 13 to the imaging lens 15. During scanning, the half-rate carriage 14 is driven by a drive mechanism (not shown) so as to move substantially at a half speed of the full-rate carriage 13 in the same direction as the carriage 13.

Figure 4:
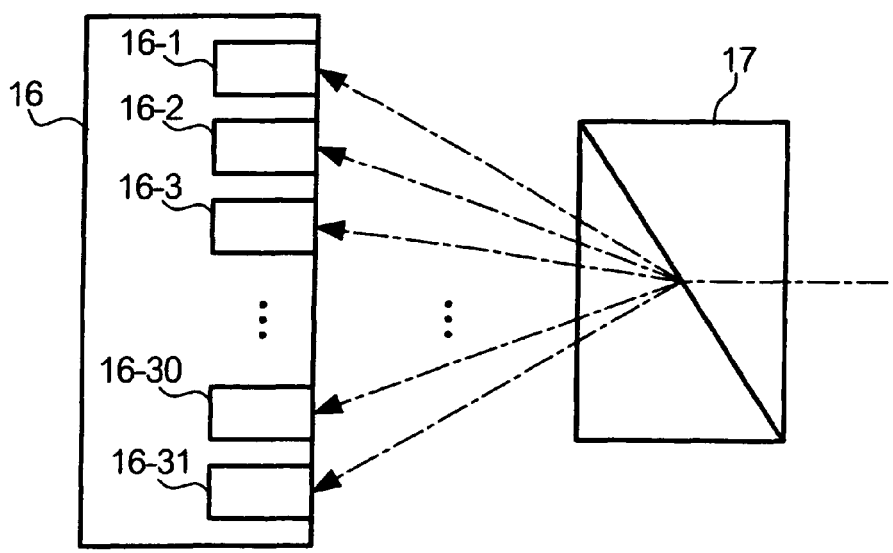
FIG. 4 depicts a structure including a prism and a line sensor in the exemplary embodiment.

The imaging lens 15 and a prism 17 are provided on a light path connecting the mirror 142 and the line sensor 16, and image the light from the object O to be imaged at the position of the line sensor 16. FIG. 4 specifically shows a structure including the prism 17 and the line sensor 16. The line sensor 16 has thirty one columns of light receiving elements, e.g., light receiving element columns 16-1, 16-2, 16-3, ..., 16-31. When reflected light from an area of the object O to be imaged reaches the position of the prism 17, the reflected light is subjected to spectral separation by the prism 17. In this case, light belonging to the visible light range (400 to 700 nm) is supposed to be spectrally separated into spectrums at wavelength intervals of 10 nm. As a result, as indicated by arrows of broken lines in the figure, the reflection light from the object to be imaged is spectrally separated into a total of thirty one wavelength ranges, e.g., 400 to 410 nm, 410 to 420 nm, 420 to 430 nm, ..., 680 to 690 nm, and 690 to 700 nm. Meanwhile, the line sensor 16 has also total thirty one light receiving element columns 16-1, 16-2, 16-3, ..., 16-30, and 16-31 whose detection sensitivities are respectively adjusted so as to match the thirty one wavelength ranges. Thus, light spectrums of the wavelength ranges separated by the prism 17 are respectively entered into the light receiving element columns 16-1, 16-2, 16-3, ..., 16-30, and 16-31. The light receiving element columns then detect intensities of the light spectrums, respectively, and generate image signals corresponding to the intensities. The image signals are supplied to the image processing unit 50.

The structure of the image forming unit 20 will now be described. The image forming unit 20 has plural sheet feed trays 21, plural conveyor rolls 22, first-transfer units 23a, 23b, and 23c, an intermediate transfer belt 24, a second-transfer roll 25, a backup roll 26, a first-fixing mechanism 27, a switching mechanism 28, and a second-fixing mechanism 29

The sheet feed trays 21 each contain sheets of a predetermined size and feed the sheets in accordance with image formation. The sheets used here are paper sheets normally used for image formation, such as PPC (Plain Paper Copier) sheets. If necessary, it is possible to use paper sheets coated with resins or the like or sheets made of other material than paper. The conveyor rolls 22 form a conveyor path for conveying sheets fed from the sheet feed trays 21 to a position where the second-transfer roll 25 faces the backup roll 26. The conveyor path for sheets is indicated by a broken line in FIG. 2. The first-transfer units 23a, 23b, and 23c form toner images according to supplied image data, and transfer the toner images to the intermediate transfer belt 24.

Figure 5:
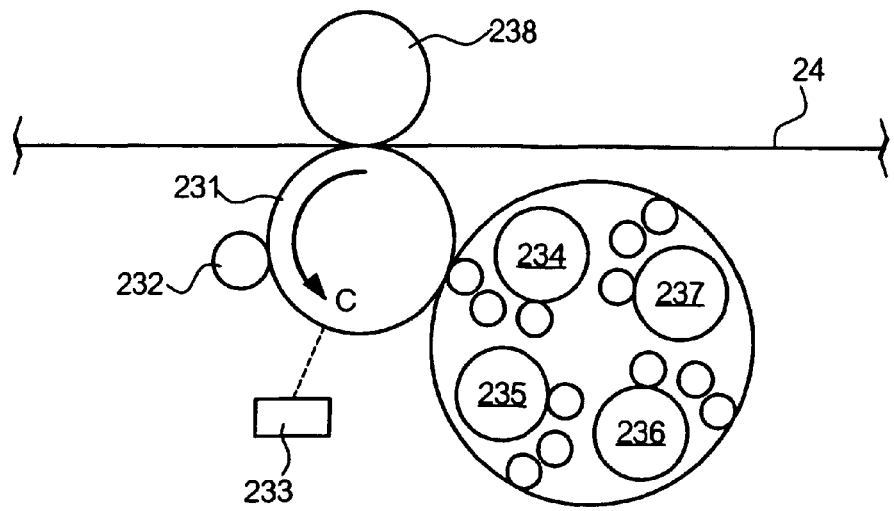
FIG. 5 depicts a structure of a developing mechanism according to the exemplary embodiment.

Referring now to FIG. 5, the structure of the first-transfer units 23a and 23b will be described in more detail. Although the first-transfer units 23a and 23b respectively use different toners, the units 23a and 23b have the same structure. These components will therefore be described referring only to the reference numeral "23", omitting appendices "a" and "b" from reference symbols. The first-transfer unit 23 includes a photosensitive drum 231, electric charger 232, exposure device 233, developing units 234, 235, 236, and 237, and a first-transfer roll 238. The photosensitive drum 231 is an image carrier on which a photoconductive layer made of organic photoconductive material is formed as an electric charge acceptor. The photosensitive drum 231 is rotated in the direction of arrow C in the figure. The electric charger 232 has a charge roller and electrically charges the surface of the photosensitive drum 231 uniformly. The exposure device 233 irradiates the surface of the photosensitive drum 231 with light from a laser diode, to form an electrostatic latent image having a predetermined electric potential on the surface of the photosensitive drum 231. The developing units 234, 235, 236, and 237 respectively contain toners for different colors, and each generates a predetermined potential difference (developing bias) to the surface of the photosensitive drum 231. The potential difference causes each toner to stick to the electrostatic latent image formed on the photosensitive drum 231, to form a toner image. The developing units 234 to 237 constitute a developing device of a so-called rotary type. The first-transfer roll 238 generates a predetermined potential difference (first-transfer bias) at the position where the intermediate transfer belt 24 faces the photosensitive drum 231. The toner image is transferred to the surface of the intermediate transfer belt 24 by the potential difference. The first-transfer unit 23c is a developing unit for one single color. Though the number of kinds (colors in this case) of toners contained in the first-transfer unit 23c differs from those in the first-transfer units 23a and 23b, the first-transfer unit 23c operates substantially in the same manner as the units 23a and 23b. Therefore, description of operation of the first-transfer units 23a and 23b will herein be omitted.

The image forming unit 20 uses toners of a total of nine colors for development, which include four primary colors of cyan, magenta, yellow, and black, further red, orange, green, and blue (the foregoing toners of eight colors are referred to as "color toners"), and still further a transparent color (a toner for the transparent color is referred to as a "transparent toner"). The transparent toner contains no coloring material and consists of a low-molecular-weight polyester resin externally added with $SiO_2$ (silicon dioxide), $TiO_2$ (titanium dioxide), or the like. A toner image consisting of the transparent toner is formed over an entire image, to reduce gaps which are caused by differences in toner amount between all positions on the image. Accordingly, surface roughness of the image effectively becomes inconspicuous. Toners described above are contained at appropriate positions in the first-transfer units 23a, 23b, and 23c, depending on how frequently the toners are used or the like. However, the transparent toner should desirably be contained at a particular position which prioritizes transfer of the transparent toner to transfer of the color toners. This is because the transparent toner is transferred so as to cover color toners on the surface of each sheet.

Referring now to FIG. 2 again, the other components of the image forming unit 20 will be described. The intermediate transfer belt 24 is an endless belt member which is moved in the direction indicated by arrow D in the figure by a drive mechanism (not shown). To the intermediate transfer belt 24, toner images are transferred (first-transfer process) at positions where the belt faces the photosensitive drums 231a, 231b, and 231c. The intermediate transfer belt 24 further transfers (second-transfer process) the toner images to a sheet. The second-transfer roll 25 and the backup roll 26 generate a predetermined potential difference (a second-transfer bias) at a position where the intermediate transfer belt 24 faces the sheet, thereby to transfer the toner images to the sheet. The first-fixing mechanism 27 has a roll member to heat and press the sheet, and fixes toner images transferred to the surface of the sheet. The switching mechanism 28 varies the convey path for conveying the sheet, depending on types of toner images formed on the surface of the sheet. Specifically, if toner images formed on the surface of the sheet include the transparent toner, the switching mechanism 28 controls the sheet to be conveyed in a direction indicated by arrow R in the figure. Otherwise, the sheet is conveyed in a direction indicated by arrow L in the figure and discharged outside.

The second-transfer mechanism 29 has a fixing belt 291, heater 292, and heat sink 293. In the second-transfer mechanism 29, the heater 292 further heats a sheet which has once been fixed by heating and pressing conducted by the first-fixing mechanism 27. Toners are thereby changed into a molten state again. The second-transfer mechanism 29 then cools the sheet by the heat sink 293 to fix toners, with the sheet maintained in contact with the fixing belt 291 having a smooth surface. Through this fixing process, toner images can be formed with flat and smooth surfaces and with high glossiness.

Outline of the image forming process will now be described.

The full-rate carriage 13 in the image forming unit 20 scans an object O to be imaged by irradiating the object with light from the light source (this process will be hereinafter referred to as a "scanning operation"), to generate an image signal. The image processing unit 50 generates image data from the image signal obtained by the scanning operation, and calculates spectral reflectances.

Meanwhile, in image forming devices according to related arts, spectral reflectances are not dealt with as continuous values but as discrete values. That is, a predetermined number of spectral reflectances are calculated (or extracted) from wavelength ranges which are included in the visible light range and actually used for processes of image forming and the like. Hereinafter, a "spectral reflectance estimation function" refers to a function (a continuous value) from which an estimated value can be obtained by performing regression analysis or the like on "spectral reflectances" (discrete values) extracted from particular wavelength ranges.

If spectral reflectances are regarded to be a continuous value as is originally meant, the continuous value draws a curve along which a value varies smoothly. In many cases where spectral reflectances are extracted as discrete values, a spectral reflectance estimation function can be obtained with satisfactory accuracy by supposing a wavelength interval δ=10 nm. If the wavelength interval δ=10 nm is set and if a wavelength range from which spectral reflectances should be extracted is set to 400 to 700 nm within the visible light range, thirty one spectral reflectances are extracted per pixel. However, in a case of using an image forming device of a commonly used structure, an object to be imaged is scanned within only three wavelength ranges of R, G, and B, and therefore, only three signals need to be transferred per pixel via signal lines or a bus. If the image forming device with the commonly used structure extracts thirty one spectral reflectances per pixel, the total number of spectral reflectances extracted from entire image data is (extracted spectral reflectances per pixel)×(the number of pixels). Consequently, a huge number of values, which are about ten times greater in data volume than in normal cases of adopting the commonly used structure, have to be transferred via signal lines or a bus. With such a huge number of values, a very long time is required even to simply transfer spectral reflectances as data.

In order to reduce the amount of data expressing spectral reflectances to be transferred by the image forming device, the amount of data of m spectral reflectances extracted at wavelength intervals δ has to be reduced. More specifically, m spectral reflectances are better expressed by linear combination of a small number n of eigenvectors than by m. That is, if coefficients can be determined for predetermined n eigenvectors, spectral reflectance estimation functions having various characteristics can be uniquely determined. Accordingly, the data amount can be reduced. However, to reduce the data amount in this manner, the number n of eigenvectors should desirably be small. On the other hand, to reduce differences between spectral reflectance estimation functions and original spectral reflectances of an object to be imaged, spectral reflectances having various characteristics need to consist of eigenvectors which have relatively high contribution ratios.

The following describes in detail how spectral reflectances can be expressed by eigenvectors having relatively high contribution ratios. As is described above, spectral reflectances originally are continuous amounts. Many of such continuous values belong to wavelength ranges in which the continuous values are expressed as curves that vary smoothly in accordance with changes of the wavelengths. In other words, spectral reflectances whose wavelength ranges are close to each other have close values in many cases. This is due to the fact that two light spectrums in close wavelength ranges have similar characteristics. When an object to be imaged is irradiated with two such light spectrums, intensities of reflected light spectrums from the object also have close characteristics. Therefore, a spectral reflectance of a wavelength range can be considered to be correlative to a spectral reflectance of another wavelength range, and can also be considered to accompany existence of a eigenvector having a relatively large contribution ratio. Accordingly, expressing a spectral reflectance estimation function by use of a eigenvector can be an effective measure to reduce a data amount.

There will further be described a procedure for calculating a spectral reflectance estimation function by using eigenvectors as described above.

To begin with, a manner of defining a eigenvector will be described. At first, a population is constituted by spectral reflectances for a huge number of colors which are supposed to be included in an object to be imaged. Further, multivariate analysis (adopting principal content analysis in the following) is carried out on the population as described above, to define a eigenvector. Since a spectral reflectance estimation function can be expressed, for every color, by linear combination of eigenvectors, the population should desirably consist of spectral reflectances for as many colors as possible, which do not have close spectral reflection characteristics.

Taking the foregoing into consideration, spectral reflectances can be estimated with satisfactory accuracy if the population is constituted of spectral reflectances of approximately 500 to 1,000 colors or so.

Next, principal content analysis is performed on the population to define eigenvectors.

The defined n eigenvectors are expressed as $e_{ni}(\lambda)$ (i=1 to n), and a spectral reflectance estimation function expressed by linear combination of these vectors is expressed as $\rho_n(\lambda)$.

Figure 6:
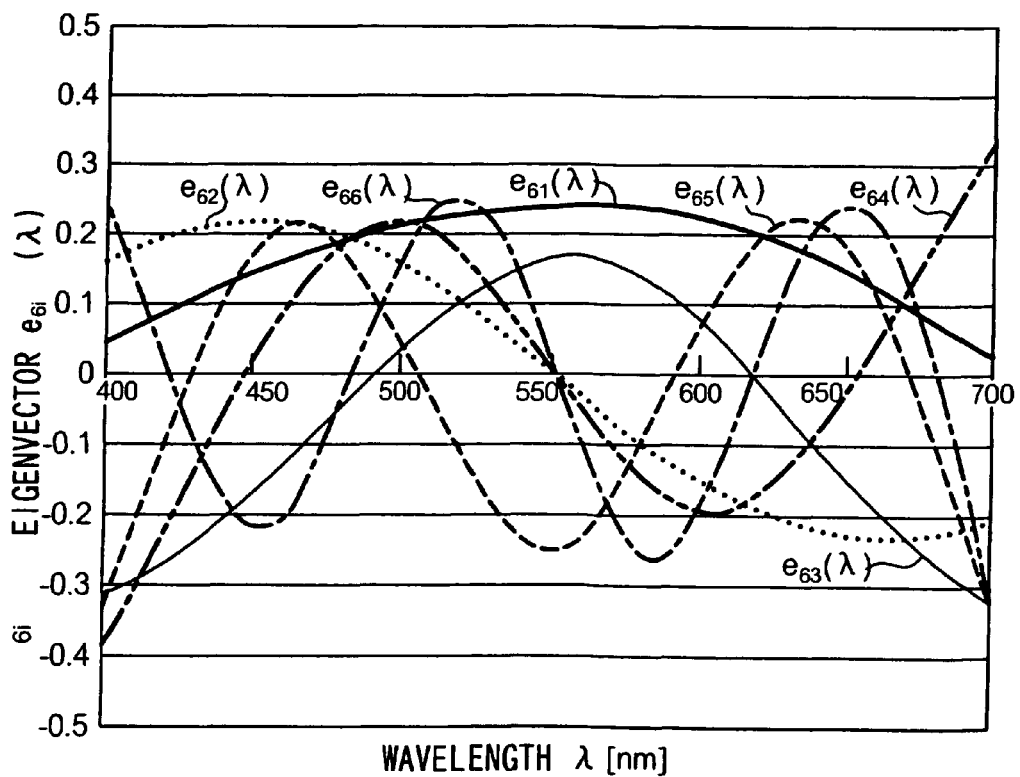
FIG. 6 shows eigenvectors according to the exemplary embodiment.

FIG. 6 shows the eigenvectors defined from a population $\Sigma$. The figure shows the eigenvectors where the number of eigenvectors is six. The horizontal axis represents a wavelength $\lambda$, and values of the six eigenvectors $e_{6i}(\lambda)$ ($e_{61}(\lambda)$ to $e_{66}(\lambda)$) are represented along the vertical axis. The eigenvectors $e_{61}(\lambda)$ to $e_{66}(\lambda)$ have different characteristics if a different method for calculating the principal content analysis is adopted.

Figure 7:
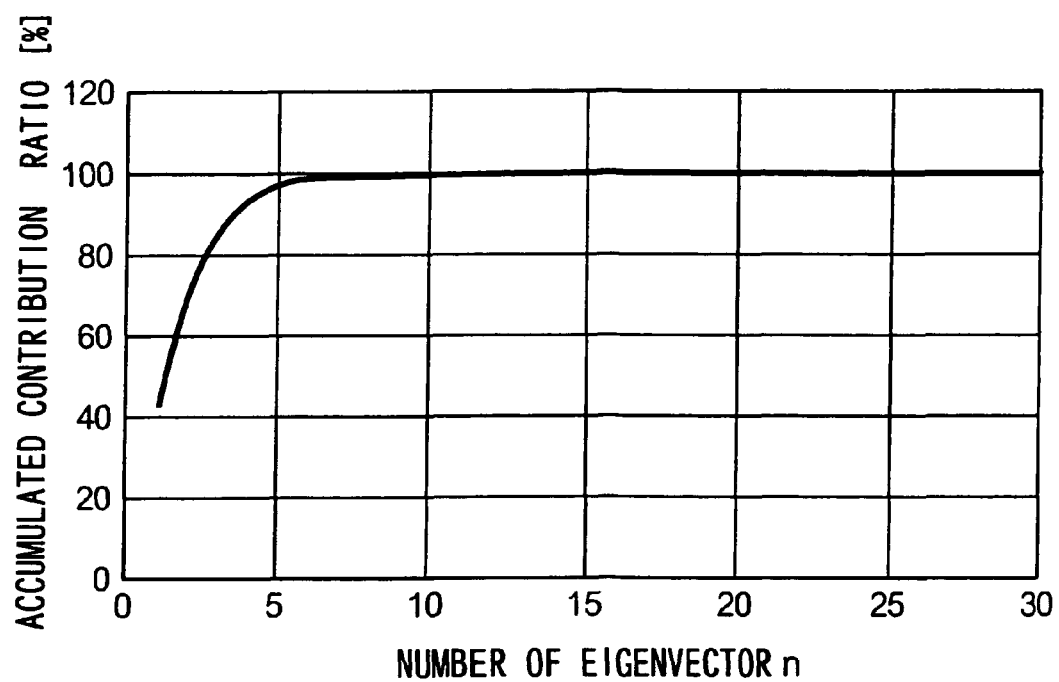
FIG. 7 shows a relationship between the number of eigenvectors and an accumulated contribution ratio.

FIG. 7 shows a relationship between the number n of eigenvectors and an accumulated contribution ratio with respect to eigenvectors $e_{n1}(\lambda)$ to $e_{nn}(\lambda)$. In this figure, as the number n of eigenvectors increases, the accumulated contribution ratio with respect to the population $\Sigma$ of eigenvectors $e_{61}(\lambda)$ to $e_{66}(\lambda)$ increases. Therefore, from the viewpoint of estimation accuracy, it can be said that the number n should desirably be as great as possible. However, as the number of eigenvectors increases, processing to be performed by the device becomes more complex, and requires longer processing time. A realistically effective measure would be to use a predetermined number that is enough to calculate a spectral reflection estimation function with certain accuracy. In case of the figure, the accumulated contribution ratio is about 98% where the number n of eigenvectors is n=6. This value allows spectral reflectances constituting the population $\Sigma$ to be expressed with satisfactory accuracy if the spectral reflectance estimation function is obtained based on eigenvectors $e_{61}(\lambda)$ to $e_{66}(\lambda)$. Furthermore, in case of spectral reflectances not included in the population $\Sigma$, the spectral reflectances have close characteristics as long as a spectral reflectance having a small color difference to the color expressed by the spectral reflectance is included in the population $\Sigma$. Accordingly, a spectral reflectance estimation function can be calculated by interpolation even for a spectral reflectance not included in the population $\Sigma$.

In view of the accumulated contribution ratio when the number of eigenvectors is seven or higher, the accumulated contribution ratio does not substantially increase but stays flat. That is, if the number n of eigenvectors exceeds a certain value, the data amount simply increases, and the accuracy of the spectral reflectance estimation function does not substantially improve. On the other hand, if the number of eigenvectors is five or smaller, the data amount of the spectral reflectance estimation function is reduced to be much smaller. However, in this case, the accumulated contribution ratio with respect to the population $\Sigma$ drops sharply. For example, if the number of eigenvectors is set to two, the accumulated contribution ratio with respect to the population $\Sigma$ is about 60%. With this rate, spectral reflectance estimation functions cannot attain satisfactory accuracy even for spectral reflectances belonging to the population $\Sigma$. Therefore, the number of eigenvectors should desirably be selected, balancing between the accumulated contribution ratio with respect to a defined population of eigenvectors and a data amount required for the accumulated contribution ratio.

Subsequently, a relationship between the eigenvector $e_{ni}(\lambda)$ and the spectral reflectance estimation function $\rho_1(\lambda)$ is expressed as a relation expression 1 below. In the following, thirty one spectral reflectances (m=31) at the wavelength interval $\delta$=10 nm within a wavelength range of 400 to 700 nm are extracted from each of pixels constituting image data.

$$\rho_n(\lambda) = \sum_{i=1}^{n} w_{ni} e_{ni}(\lambda) \quad (1)$$

In the above expression 1, the coefficient $w_{ni}$ concerns the eigenvector $e_{ni}(\lambda)$ which is necessary to express the spectral reflectance estimation function $\rho_n(\lambda)$. A specific method for calculating coefficients $w_{n1}$ to $w_{nn}$ is as follows. At first, $\rho_n(\lambda)$ is substituted with each of spectral reflectances extracted from m wavelength ranges per pixel. Since the eigenvectors $e_{n1}(\lambda)$ to $e_{nn}(\lambda)$ have already been defined, optimal coefficients $w_{n1}$ to $w_{nn}$ are calculated by regression analysis such as a least square method. As the coefficients $w_{n1}$ to $w_{nn}$ are thus calculated, the spectral reflectance estimation function $\rho_n(\lambda)$ can accordingly be expressed by the expression 1.

Next, a specific manner of determining the number n of eigenvectors will now be described.

As described above, as the number of eigenvectors increases, the accumulated contribution ratio of the eigenvectors $e_{n1}(\lambda)$ to $e_{nn}(\lambda)$ with respect to the population $\Sigma$ increases so that differences can be reduced between spectral reflectances for all colors of an object to be imaged and the spectral reflectance estimation function $\rho_n(\lambda)$. On the other hand, as the number of eigenvectors increases, the amount of data expressing the spectral reflectance estimation function $\rho_n(\lambda)$ increases. Therefore, if a minimum number of eigenvectors with which differences to original spectral reflectances of an object to be imaged can be reduced to a certain extent are used, the amount of data can be reduced without enhancing the differences. Accordingly, in the invention, the number n of necessary eigenvectors is determined first for each of pixels constituting image data, and the spectral reflectance estimation function $\rho_n(\lambda)$ is then obtained.

To determine the necessary number of eigenvectors, spectral reflectances expressing colors of an object to be imaged are referred to. Curves shown in the upper part of the graph in FIG. 8 denote spectral reflectance curves C1 and C2 which are smoothened and which connect spectral reflectances (indicated as rectangular plot points) expressing colors of two given kinds of objects to be imaged. Particularly referring to the spectral reflectance curve C1 in this figure, there are seven wavelength ranges in which the curve is convex upward or downward (hereinafter referred to as "convex wavelength ranges").

In this exemplary embodiment, an "upward convex" curve refers to a curve having a maximum value in a wavelength range for which the spectral reflectance estimation function is to be obtained (i.e., a wavelength resulting in a maximum value is included in 400 to 700 nm). A "downward convex" curve refers to a curve having a minimum value in a wavelength range for which the spectral reflectance estimation function is to be obtained (i.e., a wavelength resulting in the minimum value is included in 400 to 700 nm).

If the spectral reflectance estimation function is obtained based on spectral reflectances which involve a relatively large number of convex wavelength ranges, as represented by the spectral reflectance curve C1, a large number of eigenvectors are required to reduce differences between the spectral reflectances and the spectral reflectance estimation function. On the other hand, particularly referring to the spectral reflectance curve C2, there are only two convex wavelength ranges, and wavelength ranges in which spectral reflectances relatively monotonously vary are wide. Thus, if the spectral reflectance estimation function is obtained based on spectral reflectances which involve a relatively small number of convex wavelength ranges, even a small number of eigenvectors are enough to reduce differences between the spectral reflectances and the spectral reflectance estimation function. Therefore, if the number of convex wavelength ranges on a spectral reflectance curve is detected and if the number of eigenvectors is determined to correspond to the detected number, the spectral reflectance estimation function can be obtained by a minimum necessary number of eigenvectors for each of pixels constituting image data.

Next, a specific method for detecting the number of convex wavelength ranges included in a spectral reflectance curve will be described.

To detect the number of convex wavelength ranges, derivatives at plural wavelengths on a spectral reflectance curve are used. A function representing a spectral reflectance curve is $R(\lambda)$, which is differentiated one time by a wavelength $\lambda$ to obtain a value $R'(\lambda)$. In this manner, inclinations of tangents at respective wavelengths on the curve can be obtained. If $R'(\lambda)>0$, the inclination of a tangent at the wavelength $\lambda$ is positive. If $R'(\lambda)<0$, the inclination at the wavelength $\lambda$ is negative. If $R'(\lambda)=0$, the inclination of the tangent at the wavelength $\lambda$ is zero, i.e., the tangent is parallel to the horizontal axis representing the value of the wavelength $\lambda$. That is, spectral reflectance curves in convex wavelength ranges include wavelengths which satisfy $R'(\lambda)>0$ and wavelengths which satisfy $R'(\lambda)<0$ Particularly, the spectral reflectance curve in each upward convex wavelength range includes a wavelength $\lambda$ at which $R'(\lambda)>0$ is satisfied at a low wavelength side, and another wavelength $\lambda$ at which $R'(\lambda)<0$ is satisfied at a high wavelength side. Therefore, the number of upward convex wavelength ranges can be detected by counting of the number of wavelength ranges in which $R'(\lambda)<0$ is satisfied at a high wavelength side.

In many cases, if the number of convex wavelength ranges having upward convex curves is n, differences between a spectral reflectance estimation function and original spectral reflectances of an object to be imaged can be reduced to a certain extent by using n or more eigenvectors. Therefore, the number n of eigenvectors is determined corresponding to the number of convex wavelength ranges having upward convex curves. The number n of eigenvectors can be equal to the number of such convex wavelength ranges or can be determined by adding one to the number of such convex wavelength ranges for a purpose of obtaining a spectral reflectance estimation function more accurately. In brief, the number of eigenvectors needs only to be equal to or more than the number of convex wavelength ranges.

Figure 8:
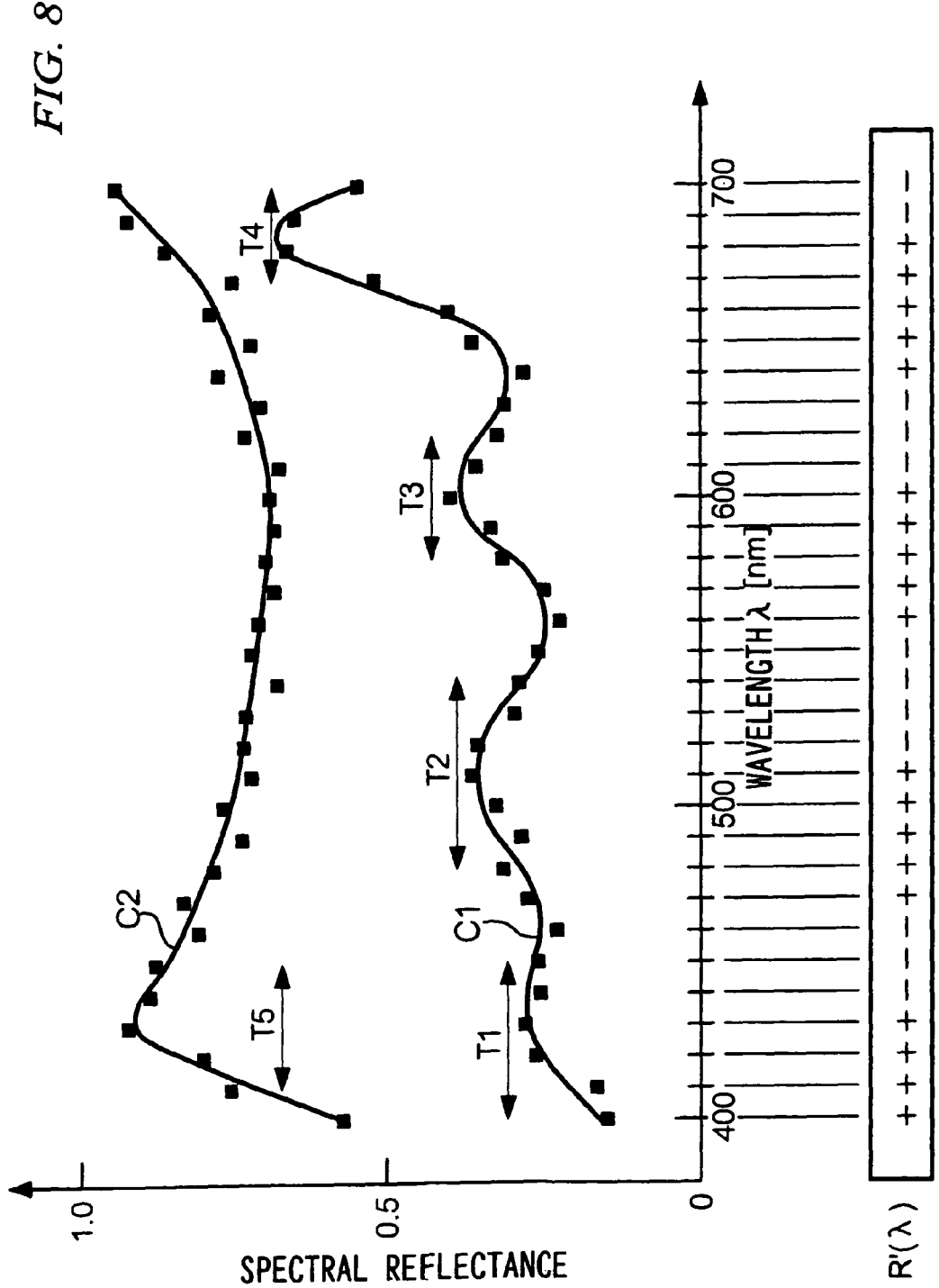
FIG. 8 is a graph showing spectral reflectance estimation functions and positive or negative states of derivatives.

For the reasons described above, spectral reflectance curves are smoothened as shown in the upper graph in FIG. 8. In this manner, curves in convex wavelength ranges are made conspicuous so as to allow the image forming device 1 to determine the number of eigenvectors, corresponding to the number of convex wavelength ranges.

The above configuration will now be described referring to a specific example as shown in FIG. 8. The lower part of FIG. 8 shows positive or negative states of $R'(\lambda)$ at respective wavelengths along the spectral reflectance curve C1. The figure shows an example of calculating $R'(\lambda)$ at the shortest wavelengths (e.g., at 400 nm, 410 nm, ..., 690 nm, 700 nm) in wavelength ranges in which spectral reflectances are calculated. Positive and negative states of $R'(\lambda)$ relative to the spectral reflectances are shown in the figure. The positive and negative states of $R'(\lambda)$ are "++++−−−+++++−−−−+++++−−−+++++−−" in order from a low wavelength side (of $\lambda=400$ nm) to a high wavelength side ($\lambda=700$ nm). Every wavelength range in which the state of $R'(\lambda)$ changes from positive (+) to negative (−) includes a maximum value along an upward convex curve. Therefore, the number of convex wavelength ranges having upward convex curves can be detected by counting the number of wavelength ranges having such change of the state from positive to negative. In case of the spectral reflectance curve C1, the number of convex wavelength ranges having upward convex curves is four, e.g., the convex wavelength ranges T1 to T4 shown in the figure. This number of four is equal to the number obtained based on positive and negative states of $R'(\lambda)$ shown in the lower part of FIG. 8. Accordingly, the spectral reflectances plotted by the spectral reflectance curve C1 respectively result in small differences as long as the spectral reflectance estimation function is obtained from at least four eigenvectors. Meanwhile, the spectral reflectance curve C2 needs only one eigenvector since the curve C2 has only one convex wavelength range T5 corresponding to the number obtained based on change of the state from positive to negative.

Described next will be a specific operation procedure to be carried out by the image forming device 1.

In a phase of manufacturing the image forming device 1, a population $\Sigma$ is prepared manually or by the device 1 itself in advance so that the population $\Sigma$ consists of spectral reflectances of various colors which are supposed to be included in an object to be imaged. Each of n eigenvectors $e_{n1}(\lambda)$ to $e_{nn}(\lambda)$ is defined by principal content analysis on the population $\Sigma$. The number n of eigenvectors is used within a range of $1<=n<=N$. Eigenvectors $e_{ni}(\lambda)$ (n=1 to N, i=1 to N) are stored in an internal memory in the image processing unit 50 or the like.

Figure 9:
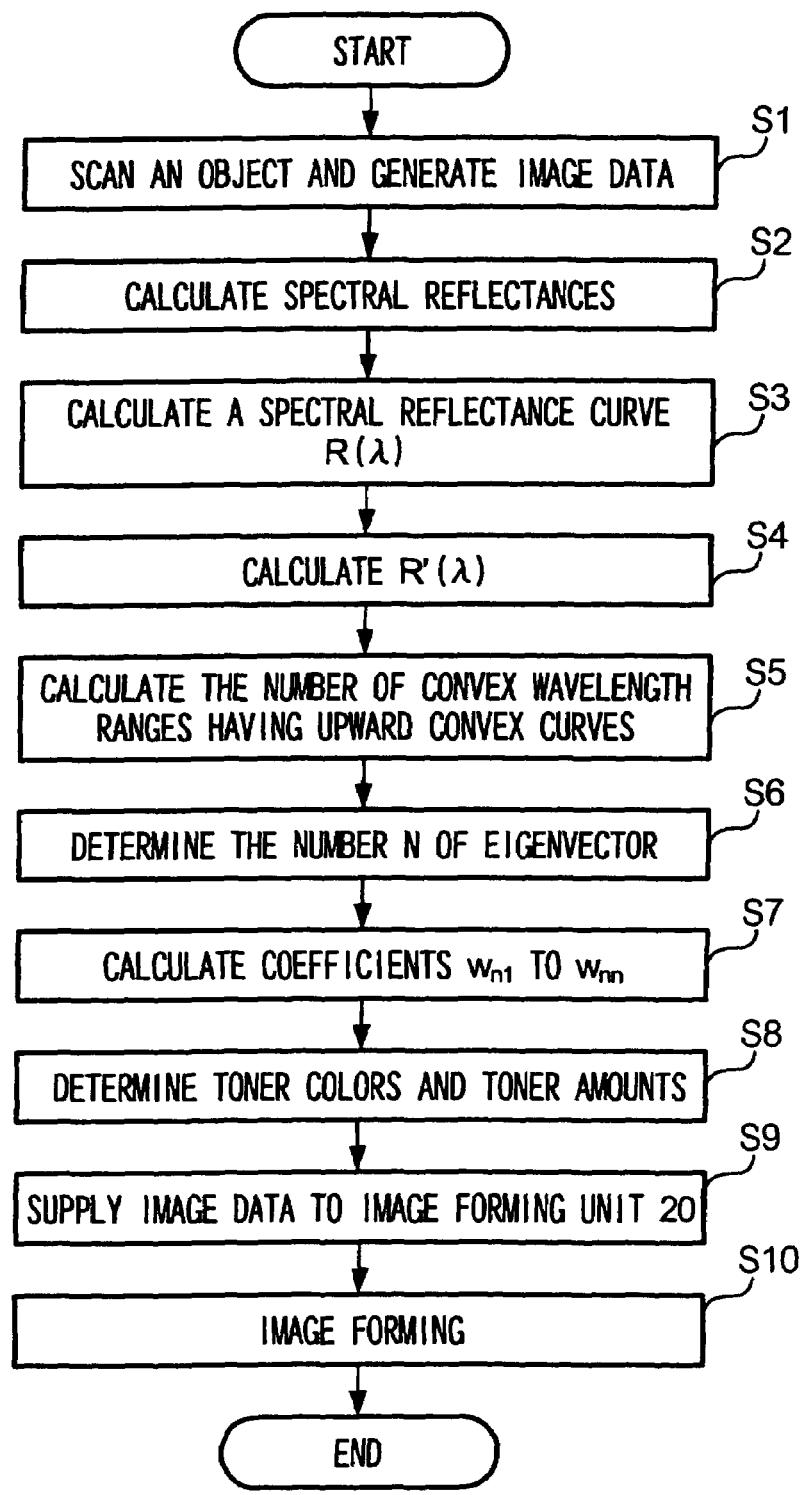
FIG. 9 is a flowchart showing an operation procedure of the image forming device according to the exemplary embodiment.

FIG. 9 is a flowchart showing an operation procedure involved until an image is formed on a recording sheet P after scanning operation is performed on an object O to be imaged.

An object O to be imaged is placed on the platen glass 11, and an operator inputs an instruction to start image forming. Then, the image reading unit 10 irradiates the object O with light from a light source to generate an image signal. Based on the image signal, the image processing unit 50 generates image data (step S1). Next, the image processing unit 50 calculates spectral reflectances for each of pixels constituting the image data (step S2). More specifically, thirty one spectral reflectances are calculated per pixel at wavelength intervals of $\delta=10$ nm within a wavelength range (400 nm<=$\lambda$<=700 nm) from which spectral reflectances are extracted.

Subsequently, based on the calculated spectral reflectances, the image processing unit 50 obtains a function $R(\lambda)$ representing a spectral reflectance curve for each pixel (step S3). Further, the image processing unit 50 calculates derivatives $R'(\lambda)$ at predetermined wavelengths on the spectral reflectance curve (step S4). Based on positive and negative states of the derivatives $R'(\lambda)$ calculated in the step S4, the image processing unit 50 detects the number of convex wavelength ranges each drawing an upward convex curve (step S5). Further, the image processing unit 50 determines the number n of eigenvectors used for obtaining a spectral reflectance estimation function, corresponding to the number of convex wavelength ranges having upward convex curves (step S6).

Next, the image processing unit 50 reads, from an internal memory, eigenvectors $e_{n1}(\lambda)$ to $e_{nn}(\lambda)$ corresponding to the number of eigenvectors determined by the step S6. The image processing unit 50 calculates coefficients $w_{n1}$ to $w_{nn}$ with respect to the n eigenvectors $e_{n1}(\lambda)$ to $e_{nn}(\lambda)$ by regression analysis such as a least square method, in order to calculate the spectral reflectance estimation function representing the object O to be imaged (step S7). Next, the controller 30 executes color space processing for image data and screen processing, to determine colors and amounts of toners to be applied to areas respectively corresponding to pixels of image data (step S8).

When determining toner amounts, the controller 30 specifies mixing ratios between colors of toners (coloring materials) of cyan, magenta, yellow, black, red, orange, green, and blue for each pixel, area ratios, and shapes of screen dots, depending on colors expressed by the spectral reflectance estimation function $\rho_n(\lambda)$. The controller 30 can further determine whether or not a transparent toner should be used, depending on an image expressed by the image data. For example, if the image data is monochrome document data which requires toners of a small number of colors, the controller 30 sets zero as a toner amount of the transparent toner. Otherwise, if the image includes multiple colors, i.e., if toners of a large number of colors are used, the controller 30 applies a predetermined amount of transparent toner to the entire surface of the image data.

The controller 30 supplies the image forming unit 20 with the image data including information indicative of mixing ratios, area ratios, and screen dots concerning toners of respective colors for each pixel (step S9). Based on the image data, the image forming unit 20 forms an image on a recording sheet P, using plural toners (step S10).

At this time, the image forming unit 20 selects first-transfer units 23 according to image data of respective colors, and forms electrostatic latent images based on the image data. Thereafter, the image forming unit 20 selects developing units (any of 234 to 237) in compliance with toner colors indicated by the image data, and applies the selected toners to the electrostatic latent images, to form toner images. Toner images for respective colors are thus formed and each is transferred to the intermediate transfer belt 24. The image forming unit 20 further secondarily transfers the toner images to a sheet, and fixes the toner images by the first-fixing mechanism 27 and second-fixing mechanism 29. The sheet is then discharged outside. In this manner, a copy of an image representing the object O to be imaged is formed, and the image forming process terminates.

The exemplary embodiment as has been described above can be modified as follows. The following modifications can be arbitrarily combined with one another.

In the above exemplary embodiment, the number n of eigenvectors is not less than the number of convex wavelength ranges having upward convex curves. However, the number of eigenvectors can be determined to correspond to the number of convex wavelength ranges having downward convex curves or the total of convex wavelength ranges having both upward and downward convex curves.

The above exemplary embodiment defines "convex wavelength ranges" and determines the number of eigenvectors corresponding to the number of convex wavelength ranges. However, this is not the only one specific method for determining the number of eigenvectors from derivatives of a function which is expressed on the basis of spectral reflectances. For example, in an alternatively available method, the image processing unit 50 can sequentially refer to positive and negative states of derivatives in order from one derivative at the lowest wavelength to one at the highest wavelength, to simply obtain the number of changes of the derivatives from a positive state to a negative state. Then, the obtained number of changes can be taken as the number of eigenvectors. In short, the number of eigenvectors can be determined in accordance with positive and negative states of the derivatives.

The above exemplary embodiment has been described referring as an example to the image processing unit 50 built in the image forming device 1. However, the image processing unit is not limited to the structure in which the image processing unit is built in an image forming device. The image processing unit can alternatively be included in, for example, a scanner which reads images, or a computer which executes image processing. In this case, the image processing device outputs obtained coefficients to, for example, an image forming device or a recording medium. The image forming device or an information processing device which reads the coefficients from the recording medium linearly combines prestored eigenvectors and the coefficients, to obtain a spectral reflectance estimation function which represents colors. Further, the image forming device calculates amounts of plural coloring materials for expressing colors represented by the spectral reflectance estimation function. The calculated amounts of coloring materials are used to form an image on a recording material. Even in this case, the amount of data representing spectral reflectances can be reduced.

If the image processing device outputs the coefficients to the image forming device, the image forming device can calculate amounts of plural coloring materials respectively for expressing colors represented by the spectral reflectance estimation function, and output the calculated amounts of coloring materials in place of outputting coefficients as described above.

In the above exemplary embodiment, a xenon lamp is used as an approximate light source for irradiating the standard light $D_{65}$ in scanning operation. However, the type of the light source is not limited to the xenon lamp. For example, a light source which irradiates standard light A or auxiliary standard light $D_{50}$ can be used as an alternative. FIG. 3 shows spectral energy distributions of these light sources. The light A is from a light source with a color temperature of 2,856 K. The light A is characterized in that spectral energy linearly increases as the wavelength increases. An example of the light source for the light A is a tungsten lamp. The auxiliary standard light $D_{50}$ is from a light source with a color temperature of 5,000 K. As shown in FIG. 3, the spectral energy distribution of the auxiliary standard light $D_{50}$ is approximately uniform throughout the visible light range of about 400 to 700 nm.

Also in the above exemplary embodiment, the image forming device 1 forms toner images, using toners of eight colors and a transparent toner wherein the eight colors are cyan, magenta, yellow, black, red, orange, green, and blue. Colors used in the invention are not limited to these colors. One or more toners among these toners can be arbitrarily selected to be contained in the image forming device to perform developing.

Also In the above exemplary embodiment, the image forming device 1 employs a line sensor having thirty one columns of light receiving elements. However, the number of columns of light receiving elements can be more or less than thirty one. In view of a purpose of reading more colors from an object than three colors of R, G, and B as read according to related arts, at least four columns of light receiving elements are required. Even with use of one single column of light receiving elements, there is an available method of scanning one object plural times while switching plural color filters.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated.

What is claimed is:

1. An image processing apparatus comprising:
   a spectral reflectance calculation unit that respectively calculates m spectral reflectances in a plurality of wavelength ranges, based on intensity of light reflected from an object to be imaged and based on irradiation intensity of light that the object to be imaged is irradiated with;
   a determination unit that obtains a derivative value by differentiating with respect to a wave a function that is obtained on the basis of the m spectral reflectances, and represents a relationship between the spectral reflectances and the wavelength ranges, and determines, as a number of eigenvectors, a number equal to or greater than a number of wavelengths in which the derivative value changes from a positive value to a negative value or from a negative value to a positive value, and smaller than m;
   a coefficient calculation unit that calculates, using a CPU, coefficients where the spectral reflectances are expressed by linear combination of the number of eigenvectors and the coefficients respectively related to the eigenvectors, the number of eigenvectors being determined by the determination unit; and
   an output unit that outputs the coefficients calculated by the coefficient calculation unit.

2. The image processing apparatus according to claim 1, comprising a color material calculation unit that calculates amounts of a plurality of coloring materials for respectively expressing colors represented by the linear combination of the coefficients calculated by the coefficient calculation unit and the eigenvectors, wherein
   the output unit outputs the amounts of coloring materials calculated by the color material calculation unit, in place of outputting the coefficients.

3. The image processing apparatus according to claim 1, wherein the number of eigenvectors is equal to a number of wavelength ranges in which the derivative value changes from a positive value to a negative value.

4. The image processing apparatus according to claim 1, wherein the number of eigenvectors is greater by one than a number of wavelength ranges in which the derivative value changes from a positive value to a negative value.

5. An image reading apparatus comprising:
   an irradiation unit that irradiates an object to be imaged with light having a particular spectral energy distribution from a light source;
   a spectral reflectance calculation unit that respectively calculates m spectral reflectances respectively in a plurality of wavelength ranges, based on intensity of light reflected from the object irradiated with the light by the irradiation unit and based on irradiation intensity of the irradiated light;
   a determination unit that obtains a derivative value by differentiating with respect to a wave a function that is obtained on the basis of the m spectral reflectances, and represents a relationship between the spectral reflectances and the wavelength ranges, and determines, as a number of eigenvectors, a number equal to or greater than a number of wavelengths in which the derivative value changes from a positive value to a negative value or from a negative value to a positive value, and smaller than m;
   a coefficient calculation unit that calculates, using a CPU, coefficients where the spectral reflectances are expressed by linear combination of the number of eigenvectors and the coefficients respectively related to the eigenvectors, the number of eigenvectors being determined by the determination unit; and
   an output unit that outputs the coefficients calculated by the coefficient calculation unit.

6. An image forming apparatus comprising:
   an irradiation unit that irradiates an object to be imaged with light having a particular spectral energy distribution from a light source;
   a spectral reflectance calculation unit that respectively calculates m spectral reflectances in a plurality of wavelength ranges, based on intensity of light reflected from the object irradiated with the light by the irradiation unit and based on irradiation intensity of the irradiated light;
   a determination unit that obtains a derivative value by differentiating with respect to a wave a function that is obtained on the basis of the m spectral reflectances, and represents a relationship between the spectral reflectances and the wavelength ranges, and determines, as a number of eigenvectors, a number equal to or greater than a number of wavelengths in which the derivative value changes from a positive value to a negative value or from a negative value to a positive value, and smaller than m;
   a coefficient calculation unit that calculates, using a CPU, coefficients where the spectral reflectances are expressed by linear combination of the number of eigenvectors and the coefficients respectively related to the eigenvectors, the number of eigenvectors being determined by the determination unit;
   a color material calculation unit that calculates amounts of a plurality of coloring materials respectively for expressing colors represented by the coefficients calculated by the coefficient calculation unit; and
   an image forming unit that forms an image on a recording material by using the coloring materials of the amount calculated by the color material calculation unit.

7. An image processing method comprising:
   respectively calculating, by an image processing apparatus, m spectral reflectances in a plurality of wavelength ranges, based on intensity of light reflected from an object to be imaged and based on irradiation intensity of light that the object to be imaged is irradiated with;
   obtaining, by the image processing apparatus, a derivative value by differentiating with respect to a wave a function that is obtained on the basis of the m spectral reflectances, and represents a relationship between the spectral reflectances and the wavelength ranges;
   determining, by the image processing apparatus, as a number of eigenvectors, a number equal to or greater than a number of wavelengths in which the derivative value changes from a positive value to a negative value or from a negative value to a positive value, and smaller than m;
   calculating, by the image processing apparatus, coefficients where the spectral reflectances are expressed by linear combination of the number of eigenvectors and the coefficients respectively related to the eigenvectors, the number of eigenvectors being determined in the step of determining a number of eigenvectors; and
   outputting, by the image processing apparatus, the coefficients calculated in the step of calculating coefficients.

8. An image reading method comprising:
irradiating an object to be imaged with light having a particular spectral energy distribution from a light source;
respectively calculating m spectral reflectances in a plurality of wavelength ranges, based on intensity of light reflected from the object irradiated with the light in the step of irradiating and based on irradiation intensity of the irradiated light;
obtaining a derivative value by differentiating with respect to a wave a function that is obtained on the basis of the m spectral reflectances, and represents a relationship between the spectral reflectances and the wavelength ranges;
determining, as a number of eigenvectors, a number equal to or greater than a number of wavelengths in which the derivative value changes from a positive value to a negative value or from a negative value to a positive value, and smaller than m;
calculating, using a CPU, coefficients where the spectral reflectances are expressed by linear combination of the number of eigenvectors and the coefficients respectively related to the eigenvectors, the number of eigenvectors being determined in the step of determining a number of eigenvectors; and
outputting the coefficients calculated in the step of calculating coefficients.

9. An image forming method comprising:
irradiating an object to be imaged with light having a particular spectral energy distribution from a light source;
respectively calculating m spectral reflectances in a plurality of wavelength ranges, based on intensity of light reflected from the object irradiated with the light in the step of irradiating and based on irradiation intensity of the irradiated light;
obtaining a derivative value by differentiating with respect to a wave a function that is obtained on the basis of the m spectral reflectances, and represents a relationship between the spectral reflectances and the wavelength ranges;
determining, as a number of eigenvectors, a number equal to or greater than a number of wavelengths in which the derivative value changes from a positive value to a negative value or from a negative value to a positive value, and smaller than m;
calculating, using a CPU, coefficients where the spectral reflectances are expressed by linear combination of the number of eigenvectors and the coefficients respectively related to the eigenvectors, the number of eigenvectors being determined in the step of determining a number of eigenvectors;
calculating amounts of a plurality of coloring materials respectively for expressing colors represented by the coefficients calculated in the step of calculating coefficients; and
forming an image on a recording material by using the coloring materials of the amount calculated in the step of calculating amounts of a plurality of coloring materials.

* * * * *